(12) United States Patent
Hidaka

(10) Patent No.: US 12,337,517 B2
(45) Date of Patent: Jun. 24, 2025

(54) MOLD OPENING/CLOSING DEVICE AND METHOD FOR CONTROLLING MOLD OPENING/CLOSING DEVICE

(71) Applicant: NISSEI ASB MACHINE CO., LTD., Nagano (JP)

(72) Inventor: Yasuhiro Hidaka, Nagano (JP)

(73) Assignee: NISSEI ASB MACHINE CO., LTD., Nagano (JP)

( * ) Notice: Subject to any disclaimer, the term of this patent is extended or adjusted under 35 U.S.C. 154(b) by 177 days.

(21) Appl. No.: 17/921,565

(22) PCT Filed: Apr. 26, 2021

(86) PCT No.: PCT/JP2021/016680
§ 371 (c)(1),
(2) Date: Jan. 27, 2023

(87) PCT Pub. No.: WO2021/221022
PCT Pub. Date: Nov. 4, 2021

(65) Prior Publication Data
US 2023/0166439 A1 Jun. 1, 2023

(30) Foreign Application Priority Data
Apr. 27, 2020 (JP) .................. 2020-078455

(51) Int. Cl.
*B29C 45/82* (2006.01)
*B29C 45/67* (2006.01)
(Continued)

(52) U.S. Cl.
CPC ............. *B29C 45/82* (2013.01); *B29C 45/67* (2013.01); *B29C 49/42* (2013.01);
(Continued)

(58) Field of Classification Search
CPC ................ B29C 45/82; B29C 45/67; B29C 2945/76598; B29C 2945/76732;
(Continued)

(56) References Cited

U.S. PATENT DOCUMENTS 5,238,383 A * 8/1993 Bannai ................... B29C 45/67
264/40.5
5,582,782 A 12/1996 Kato et al.
(Continued)

FOREIGN PATENT DOCUMENTS

DE 197 44 636 4/1998
JP 58-145351 A 8/1983
(Continued)

OTHER PUBLICATIONS

International Search Report and Written Opinion of the International Searching Authority issued in International Patent Application No. PCT/JP2021/016680, dated Jun. 15, 2021, along with an English translation thereof.
(Continued)

Primary Examiner — S. Behrooz Ghorishi
(74) Attorney, Agent, or Firm — GREENBLUM & BERNSTEIN, P.L.C.

(57) ABSTRACT

A control method for a mold opening/closing device including a hydraulic cylinder that opens and closes a mold, a hydraulic drive device that drives the hydraulic cylinder by supplying a hydraulic oil, and a controller that controls the hydraulic drive device, wherein the controller changes speed change in a deceleration region, in which movement of the hydraulic cylinder is decelerated, between a first half portion and a second half portion of the deceleration region, and causes speed change rate per unit time in the second half portion to be smaller than in the first half portion.

10 Claims, 9 Drawing Sheets

(51) Int. Cl.
  *B29C 49/42* (2006.01)
  *B29C 49/56* (2006.01)
(52) U.S. Cl.
  CPC ........ *B29C 49/5605* (2022.05); *B29C 49/561* (2022.05); *B29C 2945/76598* (2013.01); *B29C 2945/76732* (2013.01); *B29C 2945/76866* (2013.01); *B29C 2945/76872* (2013.01)
(58) Field of Classification Search
  CPC ........... B29C 2945/76866; B29C 2945/76872; B29C 2945/76595; B29C 49/062; B29C 49/5608; B29C 49/5605; B29C 49/6427; B29C 2049/023; B29C 2049/7882
  See application file for complete search history.

(56) References Cited

U.S. PATENT DOCUMENTS

| | | | |
|---|---|---|---|
| 5,906,778 A * | 5/1999 | Arai | B29C 45/762 |
| | | | 425/150 |
| 9,446,552 B2 | 9/2016 | Yamaguchi et al. | |
| 2009/0212453 A1 * | 8/2009 | Hakoda | B29C 45/76 |
| | | | 264/40.7 |
| 2015/0231816 A1 * | 8/2015 | Yamaguchi | B29C 49/4236 |
| | | | 425/537 |
| 2015/0273750 A1 * | 10/2015 | Ikarashi | B29C 45/6728 |
| | | | 264/40.5 |
| 2018/0281259 A1 * | 10/2018 | Kashiuchi | B29C 45/0416 |

FOREIGN PATENT DOCUMENTS

| | | |
|---|---|---|
| JP | 4-115921 A | 4/1992 |
| JP | 8-318552 A | 12/1996 |
| JP | 2942605 B2 | 6/1999 |
| JP | 2003/145614 A | 5/2003 |
| WO | 2014/030639 A1 | 2/2014 |

OTHER PUBLICATIONS

Supplementary European Search Report dated Apr. 18, 2024 issued in European family member application No. 21796653.0.

* cited by examiner

MOLD OPENING/CLOSING DEVICE AND METHOD FOR CONTROLLING MOLD OPENING/CLOSING DEVICE

BACKGROUND OF THE INVENTION

Field of the Invention

The present invention relates to a mold opening/closing device and a control method for the mold opening/closing device.

Description of the Related Art

For example, regarding a blow-molding method for a resin container of a hot parison type, it is required to further shorten a molding cycle in order to improve the productivity. In order to shorten the molding cycle, it is required to shorten the mold opening/closing time during injection molding and to stabilize the mold opening/closing operation. Various proposals have been heretofore made on this type of mold opening/closing control (JP 58-145351 A and JP 2942605, etc.).

From the viewpoint of shortening the mold opening/closing time, it is preferable that the time of a deceleration region for decelerating the movement of the hydraulic cylinder is as short as possible. However, when the time of the deceleration region is shortened, the mold bounds without stopping at the stop position due to abnormal hydraulic pressure fluctuation (surge pressure, oil hammer, or the like) in a hydraulic circuit on the oil discharge side, and it becomes difficult to shorten the mold opening/closing time and to stably perform the mold opening/closing operation. In addition, when the time of the deceleration region is shortened, the mold and hydraulic components are easily damaged, and a loud abnormal noise is easily generated.

SUMMARY OF THE INVENTION

One aspect of the present invention is a control method for a mold opening/closing device including a hydraulic cylinder that opens and closes a mold, a hydraulic drive device that drives the hydraulic cylinder by supplying a hydraulic oil, and a controller that controls the hydraulic drive device. The controller changes speed change in a deceleration region, in which movement of the hydraulic cylinder is decelerated, between a first half portion and a second half portion of the deceleration region, and causes speed change rate per unit time in the second half portion to be smaller than in the first half portion.

Further features of the present invention will become apparent from the following description of exemplary embodiments with reference to the attached drawings.

BRIEF DESCRIPTION OF THE DRAWINGS

FIGS. 5A and 5B are graphs illustrating an example of a relationship between a lifting/lowering speed of a cylinder and time.

DESCRIPTION OF THE EMBODIMENTS

Figure 1:
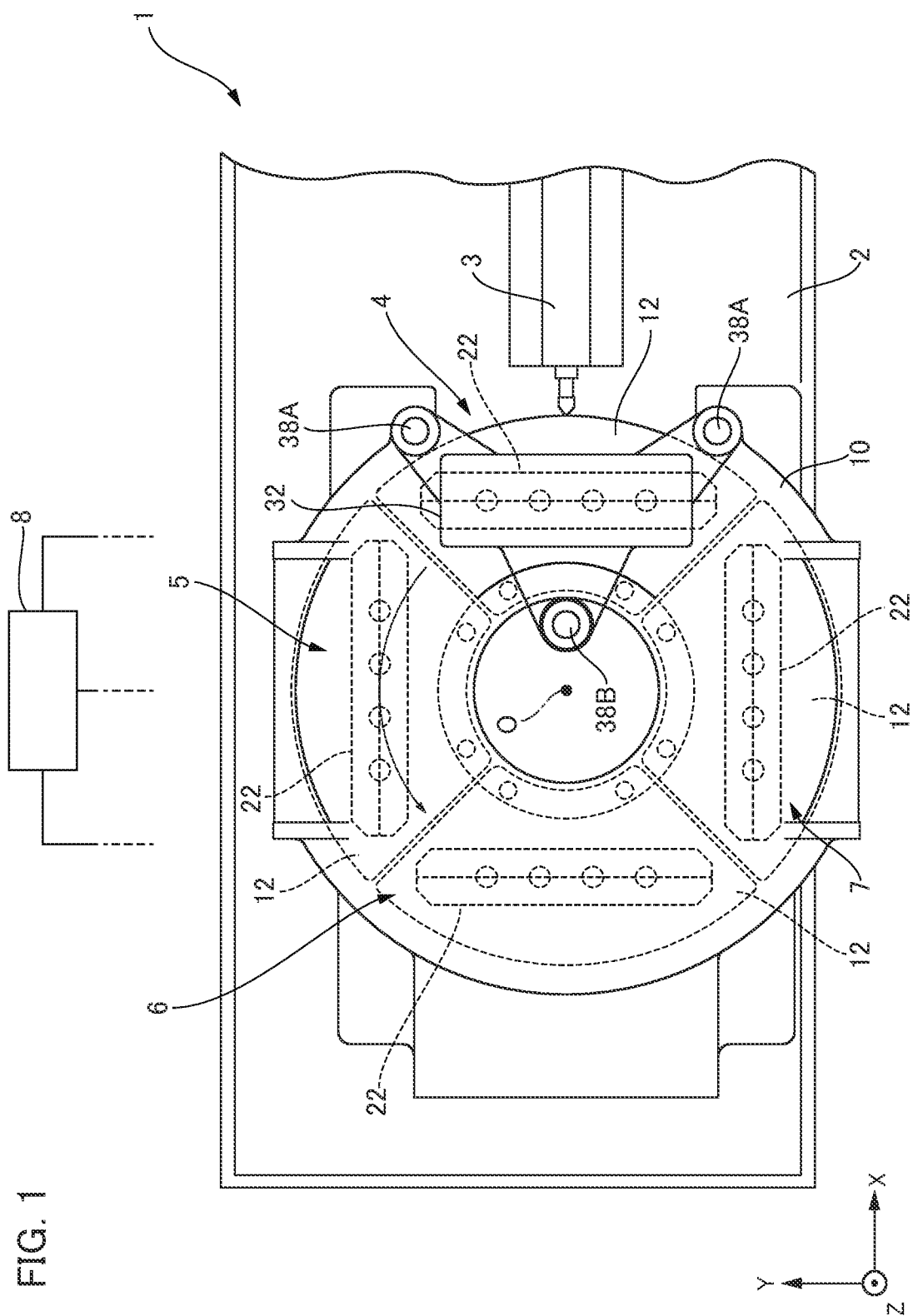
FIG. 1 is a schematic plan view of a blow-molding apparatus according to the present embodiment.

Hereinafter, an embodiment of the present invention will be described with reference to drawings.

In the embodiment, for the sake of more understandable description, structures or elements other than the main parts of the present invention will be described in a simplified or omitted manner. In addition, in the drawings, the same elements are denoted by the same reference signs. To be noted, shapes, dimensions, and the like of each element are schematically illustrated in the drawings, and do not indicate actual shapes, dimensions, and the like.

Description of Blow-Molding Apparatus

Figure 2:
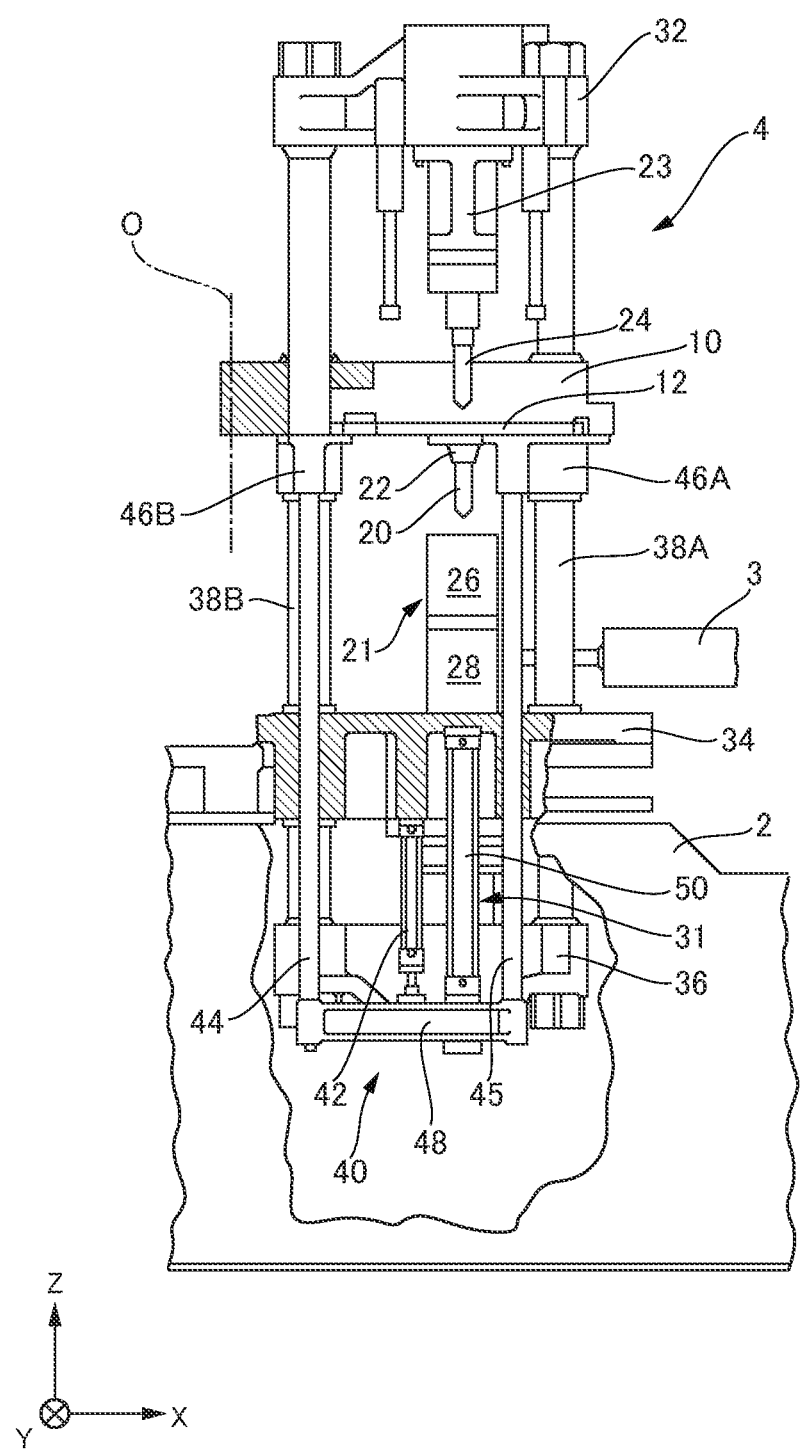
FIG. 2 is a schematic side view illustrating a mold open state of an injection molding unit in FIG. 1.
Figure 3:
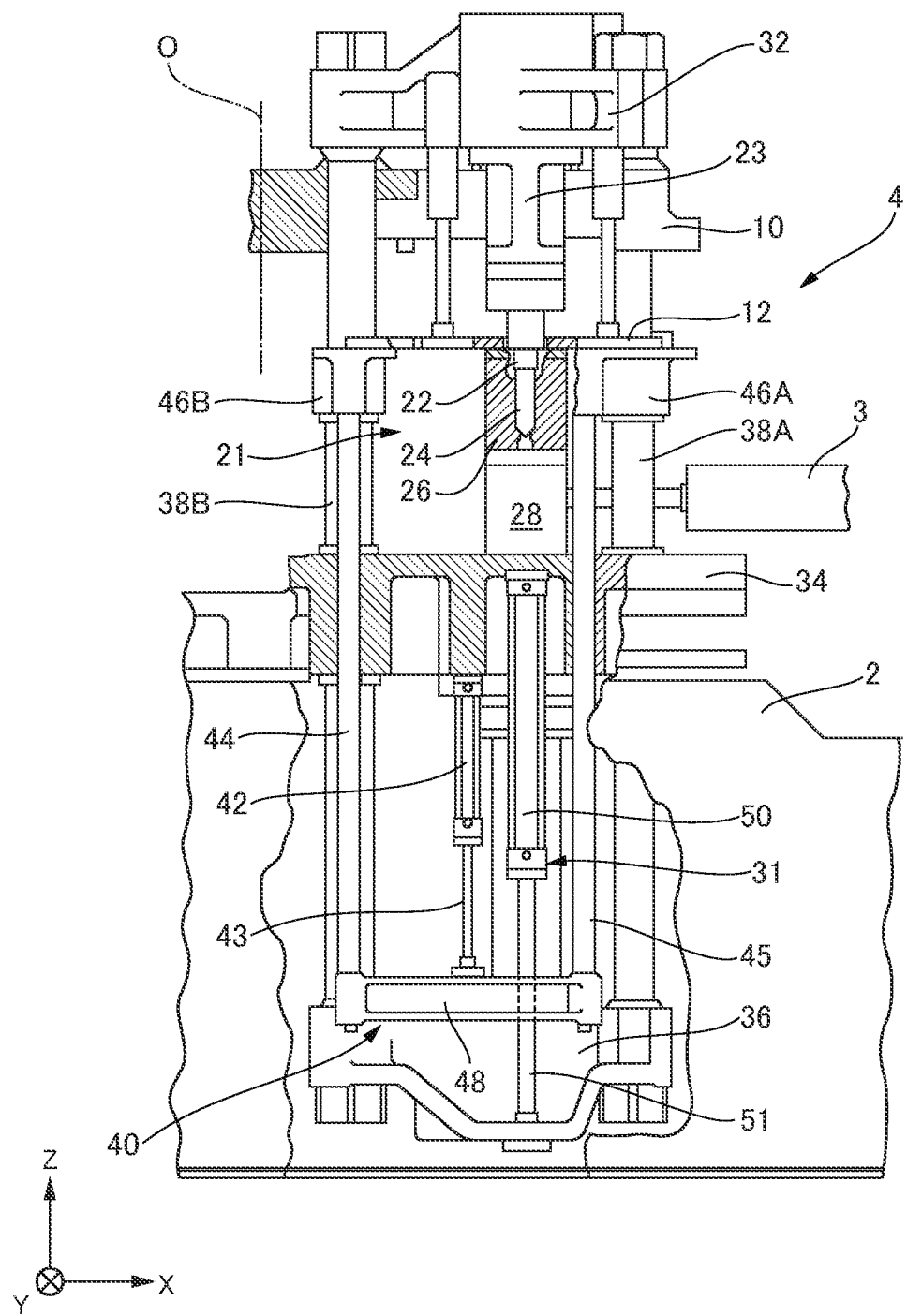
FIG. 3 is a schematic side view illustrating a mold-closed state of the injection molding unit in FIG. 1.

FIG. 1 is a schematic plan view of a blow-molding apparatus including a mold opening/closing device. FIG. 2 is a schematic side view illustrating a mold open state of an injection molding unit in FIG. 1. FIG. 3 is a schematic side view illustrating a mold-closed state of the injection molding unit in FIG. 1.

A blow-molding apparatus 1 of the present embodiment is an apparatus of a hot parison type that performs blow-molding by utilizing residual heat (internal heat) retained from injection molding without cooling a preform 20 to room temperature. The blow-molding apparatus 1 may be an apparatus configured to perform, at once, blow molding on the preform 20 having undergone injection molding (for example, an apparatus of a one-step system (also referred to as a one-stage system) illustrated in FIG. 1). Alternatively, the blow-molding apparatus 1 may be an apparatus configured to perform, in a plurality of times, blow molding on the preform 20 having undergone injection molding (for example, an apparatus of a 1.5 step system illustrated in FIG. 1 of WO2020/209294).

As illustrated in FIGS. 1 to 3, the blow-molding apparatus 1 includes a machine base 2 and an upper base plate 10 disposed above the machine base 2 (in a Z direction in the drawing). The upper base plate 10 is supported by a plurality of pillars (not illustrated) erected upward from the machine base 2.

In the blow-molding apparatus 1, an injection molding unit 4, a temperature adjusting unit 5, a blow-molding unit 6, and a take-out unit 7 are disposed in a space between the machine base 2 and the upper base plate 10. In addition, the operation of each element of the blow-molding apparatus 1 is controlled by a control unit 8.

The injection molding unit 4, the temperature adjusting unit 5, the blow-molding unit 6, and the take-out unit 7 are disposed at positions rotated by a predetermined angle (for example, 90 degrees) with respect to a rotation center O of a transfer plate 12 that will be described later. To be noted, in the blow-molding apparatus 1, the temperature adjusting unit 5 and the take-out unit 7 do not have to be disposed.

Here, at the position of the injection molding unit 4 on the upper base plate 10, an upper mold clamping plate 32 of the injection molding unit 4 and an injection core mold 24 illustrated in FIG. 2 are disposed on the upper surface side. At the position of the temperature adjusting unit 5 on the upper base plate 10, a heating core and a lifting/lowering mechanism of the heating core (both not illustrated) are disposed on the upper surface side. At the position of the blow-molding unit 6 on the upper base plate 10, a stretching rod and a lifting/lowering mechanism of the stretching rod (both not illustrated) are disposed on the upper surface side. In addition, a take-out cam (not illustrated) is disposed at the position of the take-out unit 7 on the upper base plate 10.

In addition, four fan-shaped transfer plates 12 are arranged at every predetermined angle (for example, 90 degrees) on the lower surface of the upper base plate 10 above the machine base 2. The four transfer plates 12 are respectively guided by a plurality of receiving members 46A and 46B (see FIGS. 2 and 3) fixed around the upper base plate 10, and intermittently circulate along a rotation direction having the rotation center O as a rotation axis. The preform 20 (or a container) held by the transfer plate 12 (or a neck mold 22 that will be described later) is conveyed through the injection molding unit 4, the temperature adjusting unit 5, the blow-molding unit 6, and the take-out unit 7 in this order by the rotation of the transfer plate 12. Note that the transfer plate 12 may have a single disk shape that is not divided for each molding unit.

In addition, as illustrated in FIGS. 2 and 3, a neck mold 22 for holding the preform is provided on the lower surface of each transfer plate 12 so that the axial direction of the preform 20 follows the vertical direction. Further, an opening portion is formed on the upper surface side of the neck mold 22 on each transfer plate 12, and the injection core mold 24, the blow core, the stretching rod, and the like can be inserted into the preform 20 from above through the opening portion.

(Injection Molding Unit 4)

The injection molding unit 4 includes an injection mold 21, a high-speed mold opening/closing mechanism 31 that opens and closes the injection mold 21 at a high speed, and a lifting/lowering mechanism 40 that lifts and lowers the neck mold 22 with respect to an injection cavity mold 26. An injection device 3 that supplies a resin material, which is a raw material of the preform, is connected to the injection molding unit 4.

The injection mold 21 includes an injection core mold 24 that defines the internal shape of the preform 20, an injection cavity mold 26 that defines the external shape of the preform 20, and a hot runner mold 28 that guides molten resin supplied from the injection device 3 to a mold space of the injection mold 21. The injection cavity mold 26 and the hot runner mold 28 are fixed to a lower mold clamping plate 34 attached to the machine base 2. In contrast, the injection core mold 24 is attached to the upper mold clamping plate 32 supported by tie bars 38A and 38B, and can be lifted and lowered in the vertical direction (Z direction serving as the vertical direction).

The injection molding unit 4 closes the injection cavity mold 26, the injection core mold 24, and the neck mold 22 of the transfer plate 12 to form a preform-shaped mold space. Then, by injecting a resin material from the injection device 3 into the mold space having such a preform shape, the preform 20 is manufactured by the injection molding unit 4.

The lifting/lowering mechanism 40 includes receiving members 46A and 46B that hold the transfer plate 12, a lifting/lowering cylinder 42 that lifts and lowers the receiving members 46A and 46B, and lifting/lowering rods 44 and 45 extending downward from the receiving members 46A and 46B. The receiving member 46A is disposed on the outer side in the rotation radius direction of the transfer plate 12 and is connected to the lifting/lowering rod 45. The receiving member 46B is disposed on the rotation center O side of the transfer plate 12 and is connected to the lifting/lowering rod 44. The lifting/lowering rods 44 and 45 are connected by a connecting member 48 in the machine base 2.

The lifting/lowering cylinder 42 is fixed to the lower surface of the lower mold clamping plate 34 and disposed in the machine base 2. The lifting/lowering cylinder 42 is, for example, a hydraulic cylinder, and includes a lifting/lowering piston rod 43 that is driven to advance and retreat by hydraulic pressure, and a cylinder tube that slidably accommodates the lifting/lowering piston rod 43. As illustrated in FIG. 3, the distal end of the lifting/lowering piston rod 43 is connected to the connecting member 48. The lifting/lowering cylinder 42 lifts and lowers the receiving members 46A and 46B in the up-down direction via the lifting/lowering rods 44 and 45 by lifting and lowering the connecting member 48 in the machine base 2. As a result, the transfer plate 12 held by the receiving members 46A and 46B is lifted and lowered in the up-down direction.

The high-speed mold opening/closing mechanism 31 lifts and lowers the upper mold clamping plate 32 having a substantially triangular shape disposed above the transfer plate 12 with respect to the machine base 2. A plurality of (for example, four) injection core molds 24 are fixed to the lower surface of the upper mold clamping plate 32 via a fixing plate 23. The upper mold clamping plate 32 is fixed to the upper end side of a plurality of (for example, three) columnar tie bars 38A and 38B extending upward from the machine base 2. Two tie bars 38A are arranged on the outer side in the rotation radius direction, and one tie bar 38B is arranged on the rotation center O side. The tie bars 38A and 38B are fixed near respective apices of the triangular shape of the upper mold clamping plate 32.

In addition, the lower end sides of the tie bars 38A and 38B are each fixed to a lower movable plate 36 disposed in the machine base 2. In addition, a mold opening/closing cylinder 50 is disposed between the lower surface of the lower mold clamping plate 34 and the lower movable plate 36.

The mold opening/closing cylinder 50 is fixed to the lower surface of the lower mold clamping plate 34 and disposed in the machine base 2. The mold opening/closing cylinder 50 is, for example, a hydraulic cylinder, and includes a mold opening/closing piston rod 51 that is driven to advance and retreat by hydraulic pressure, and a cylinder tube that accommodates the mold opening/closing piston rod 51. As illustrated in FIG. 3, the distal end of the mold opening/closing piston rod 51 is connected to the lower movable plate 36. The mold opening/closing cylinder 50 lifts and lowers the upper mold clamping plate 32 in the up-down direction via the tie bars 38A and 38B by lifting and lowering the lower movable plate 36 in the machine base 2. As a result, a mold opening/closing operation is performed in which the injection core mold 24 fixed to the upper mold clamping plate 32 is lifted and lowered in the up-down direction.

To be noted, even when the mold of the injection molding unit 4 is opened, the neck mold 22 of the transfer plate 12 keeps on holding and conveying the preform 20 without opening. The number of the preforms 20 simultaneously molded by the injection molding unit 4 (that is, the number of the containers that can be simultaneously molded by the blow-molding apparatus 1) can be appropriately set. As an example, FIG. 1 illustrates a configuration in which four preforms 20 are conveyed.

(Temperature Adjusting Unit 5)

The temperature adjusting unit 5 includes an unillustrated mold unit (temperature control pot or temperature control rod) for temperature adjustment, a lifting/lowering mechanism of the mold unit (both not illustrated). The temperature adjusting unit 5 performs temperature equalization and removal of uneven temperature of the preform 20 manufactured by the injection molding unit 4 using a temperature control pot, and adjusts the temperature of the preform 20 to a blow temperature (for example, about 90° C. to 105° C.) suitable for final blow. In addition, the temperature adjusting unit 5 of the present embodiment also has a function of cooling the preform 20 in a high temperature state after injection molding. To be noted, the temperature adjusting unit 5 may also be provided with a lifting/lowering mechanism (not illustrated) of the transfer plate 12 having the same configuration as in the injection molding unit 4.

(Blow-Molding Unit 6)

The blow-molding unit 6 includes the blow-molding mold, the stretching rod and a lifting/lowering mechanism of the transfer plate 12, the lifting/lowering mechanism having the same configuration as in the injection molding unit 4 (all not illustrated). The blow-molding unit 6 stretches the preform 20 disposed in the blow-molding mold in the axial direction with a stretching rod, introduces high-pressure air to the inside to perform biaxial stretching blow molding, and thus manufactures a container.

(Take-Out Unit 7)

The take-out unit 7 opens the neck mold 22 with the take-out cam, and takes out the container manufactured by the blow-molding unit 6 from the blow-molding apparatus 1. The container taken out by the take-out unit 7 is boxed or conveyed to a filling line. The take-out unit 7 may also be provided with a lifting/lowering mechanism (not illustrated) of the transfer plate 12 having the same configuration as in the injection molding unit 4.

(Control Unit 8)

The control unit 8 controls lifting and lowering of the transfer plate 12, opening and closing of the mold of each unit, an injection molding operation in the injection molding unit 4, a blow-molding operation in the blow-molding unit 6, and the like.

As an example, the control of the injection molding unit 4 by the control unit 8 includes drive control for driving at least one of the lifting/lowering cylinder 42 and the mold opening/closing cylinder 50. The control unit 8 controls the lifting and lowering of the injection core mold 24 fixed to the upper mold clamping plate 32 by adjusting the flow rate of the hydraulic oil to the mold opening/closing cylinder 50 according to the user's setting. Similarly, the control unit 8 controls the lifting and lowering of the neck mold 22 provided on the transfer plate 12 by adjusting the flow rate of the hydraulic oil to the lifting/lowering cylinder 42 according to the user's setting.

Figure 4:
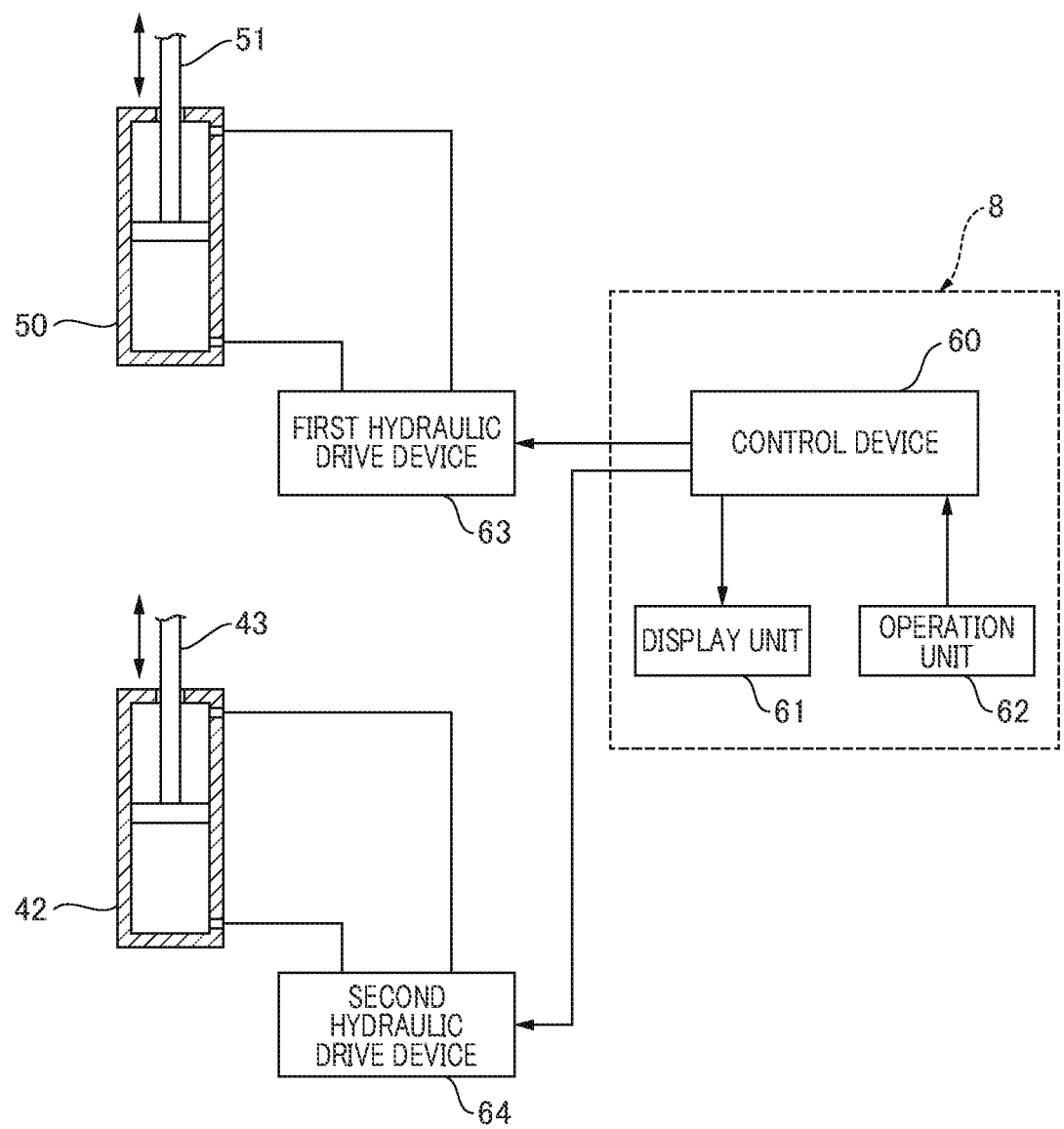
FIG. 4 is a diagram illustrating a configuration example of a control unit regarding control of a lifting/lowering cylinder and a mold opening/closing cylinder.

FIG. 4 is a diagram illustrating a configuration example of the control unit 8 regarding control of the lifting/lowering cylinder 42 and the mold opening/closing cylinder 50.

The control unit 8 includes a control device 60 such as a programmable logic controller (PLC), a display unit 61, and an operation unit 62. The control unit 8 is connected to at least a first hydraulic drive device 63 that adjusts the flow rate of the hydraulic oil to the mold opening/closing cylinder 50, and is also connected to a second hydraulic drive device 64 that adjusts the flow rate of the hydraulic oil to the lifting/lowering cylinder 42 as appropriate.

The first hydraulic drive device 63 and the second hydraulic drive device 64 each include an electromagnetic proportional valve (not illustrated) connected to an oil supply port of a hydraulic cylinder. The first hydraulic drive device 63 and the second hydraulic drive device 64 can control the degree of opening and closing of the port (the outflow port for the hydraulic oil) of the electromagnetic proportional valve by the amount of movement of the spool (valve body) of the electromagnetic proportional valve to adjust the flow rate of the hydraulic oil to each hydraulic cylinder. In addition, the first hydraulic drive device 63 and the second hydraulic drive device 64 are connected to a hydraulic circuit (not illustrated) through which hydraulic oil generated by a hydraulic pump flows. Note that the first hydraulic drive device 63 and the second hydraulic drive device 64 may include a hydraulic pump.

The control device 60 outputs a control signal instructing the movement amount of the spool to the first hydraulic drive device 63 based on a first control pattern that defines a change in the lifting/lowering speed of the injection core mold 24. As a result, the flow rate of the hydraulic oil to the mold opening/closing cylinder 50 is controlled to control the lifting and lowering of the mold opening/closing piston rod 51, and the lifting/lowering speed of the injection core mold 24 changes in the first control pattern.

Similarly, the control device 60 outputs a control signal instructing the movement amount of the spool to the second hydraulic drive device 64 based on a second control pattern that defines the change in the lifting/lowering speed of the transfer plate 12. As a result, the flow rate of the hydraulic oil to the lifting/lowering cylinder 42 is controlled to control the lifting and lowering of the lifting/lowering piston rod 43, and the lifting/lowering speed of the transfer plate 12 changes in the second control pattern.

The operation unit 62 receives an input of a parameter for adjusting the first control pattern or the second control pattern from the user. The operation unit 62 includes, for example, an operation panel including a plurality of input buttons, a touch panel, or the like.

In addition, the display unit 61 is a display device such as a liquid crystal panel, and displays a graph of a set control pattern being on a screen when the user sets the first control pattern or the second control pattern. As a result, the user can confirm the graph of the set control pattern.

The display unit 61 and the operation unit 62 may be configured as, for example, a touch panel device having a screen display function in which a light-transmissive touch panel is provided on a liquid crystal panel. To be noted, the display unit 61 and the operation unit 62 are not limited to those incorporated in the blow-molding apparatus 1, and may be externally attached via a wired or wireless communication means.

Hereinafter, adjustment of the first control pattern and the second control pattern by the control unit 8 will be described with reference to FIGS. 5A and 5B A and 5B. Here, the adjustment methods of the first control pattern and the second control pattern are substantially the same. Therefore, in the present embodiment, the first control pattern of the first hydraulic drive device 63 that lifts and lowers the injection core mold 24 will be described, and the description of the second control pattern of the second hydraulic drive device 64 that lifts and lowers the transfer plate 12 will be omitted.

Figure 5A:
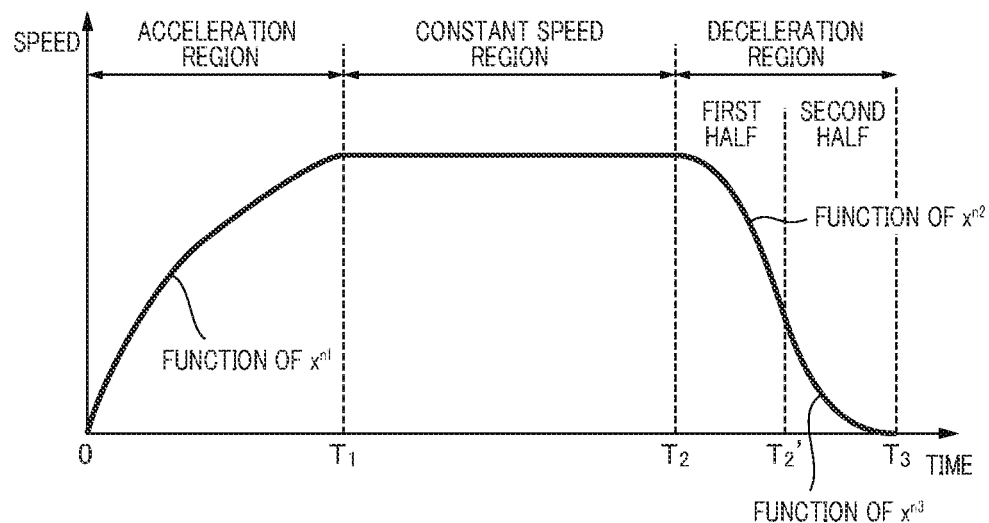
FIGS. 5A and 5B

FIG. 5A is a graph illustrating a relationship between the lifting/lowering speed of the cylinder and time in the first control pattern. In FIGS. 5A and 5B, a case of the time of mold closing will be described as an example. Regarding the control at the time of mold opening, the same control as that at the time of mold closing can be applied. To be noted, in each drawing of FIGS. 5A and 5B, the vertical axis represents the lifting/lowering speed (movement speed of the cylinder rod, lifting/lowering speed of the injection core mold, opening degree of the port of the electromagnetic proportional valve according to the movement amount of the spool, flow rate of the hydraulic oil) of the cylinder rod, and the horizontal axis represents time.

The first control pattern includes an acceleration region, a constant speed region, and a deceleration region divided according to a moving distance of the injection core mold 24.

The acceleration region is a section from 0 to T1 on the time axis, and corresponds to an operation state when the stopped hydraulic cylinder starts to be driven. In the acceleration region, the lifting/lowering speed of the cylinder rod of the hydraulic cylinder is accelerated from zero to a predetermined speed. The increase curve of the lifting/lowering speed in the acceleration region is expressed by a function of $x^{n1}$. Therefore, in the acceleration region, the mold opening/closing piston rod 51 of the mold opening/closing cylinder 50 transitions from a contracted and stopped state to an extended state in which movement is started, and the lifting/lowering speed (stretching speed) is accelerated from zero to a predetermined speed.

The constant speed region is a section from T1 to T2 on the time axis. In the constant speed region, the lifting/lowering speed of the cylinder rod of the hydraulic cylinder is maintained at a predetermined speed. Therefore, in the constant speed region, the lifting/lowering speed (extending speed) of the mold opening/closing piston rod 51 is maintained at a predetermined speed.

The deceleration region is a section from T2 to T3 on the time axis, and corresponds to an operation state when the movement of the cylinder rod of the hydraulic cylinder is stopped. In the deceleration region, the lifting/lowering speed of the cylinder is decelerated from the predetermined speed to zero according to a decrease curve set by the control unit 8. Therefore, in the deceleration region, the lifting/lowering speed (extending speed) of the mold opening/closing piston rod 51 is decelerated from the predetermined speed to zero according to the decrease curve set by the control unit 8.

Figure 5B:
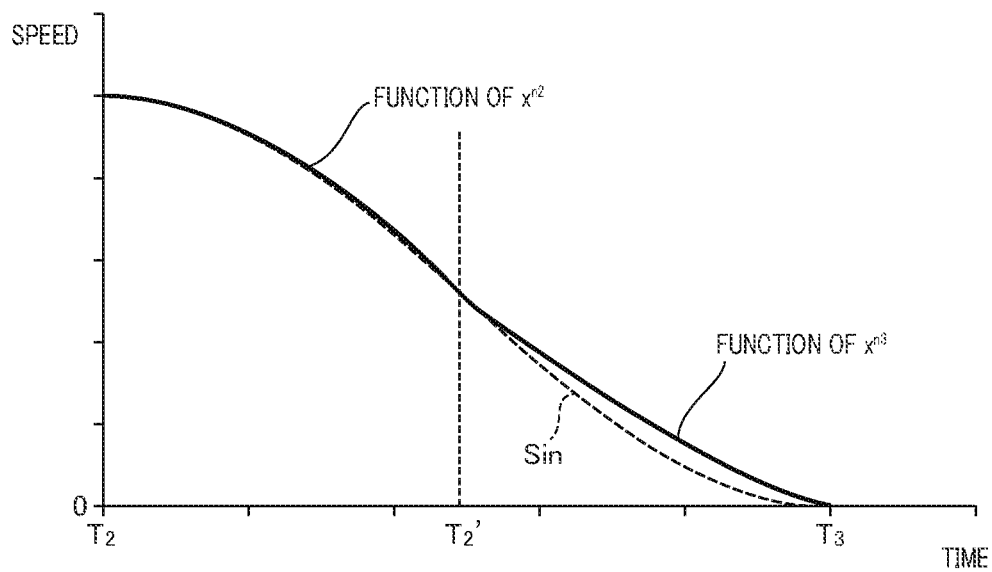

FIG. 5B is an enlarged graph illustrating a decrease curve of the lifting/lowering speed in the deceleration region of the present embodiment.

The decreasing curve of the lifting/lowering speed in the deceleration region is expressed by different functions in the first half portion (from T2 to T2') and the second half portion (from T2' to T3). The decrease curve of the first half portion is expressed by a function of $x^{n2}$, and the decrease curve of the second half portion is expressed by a function of $x^{n3}$. X, n2, and n3 are set to predetermined rational numbers (decimal and integer). Further, the position of the start point T2 of the deceleration region can be changed by the user's designation. T2' is automatically set, for example, when the control unit 8 calculates the midpoint between T2 and T3.

The operation unit 62 receives the input of the value of the index n2 of the function $x^{n2}$ and the value of the index n3 of the function $x^{n3}$ from the user. The control unit 8 sets a decrease curve of the first half portion from the function $x^{n2}$ and sets a decrease curve of the second half portion from the function $x^{n3}$ based on the input indices n2 and n3. As described above, the control unit 8 of the present embodiment can individually adjust the shapes of the respective decrease curves of the first half portion and the second half portion according to the setting by the user.

The control unit 8 preferably sets the change rate of the speed per unit time in the decrease curve of the second half portion to be smaller than that in the decrease curve of the first half portion. For example, the control unit 8 sets the function $x^{n2}$ so that a sine curve Sin indicated by a broken line in FIG. 5B substantially matches the decrease curve of the first half portion. Meanwhile, the control unit 8 sets the function $x^{n3}$ such that the change rate of the speed is smaller in the decrease curve of the second half portion than in the decrease curve (sine curve Sin) of the first half portion. As illustrated in FIG. 5B, when the decrease curve (solid line) and the sine curve (broken line) are compared in the second half portion of the deceleration portion, it can be seen that the decrease curve is closer to linear, and the change in speed per unit time thereof is closer to constant than that of the sine curve Sin.

Here, as a comparative example, a case where the decrease curve is controlled by one function (function of a sine curve) without being divided into two is assumed. In general, from the viewpoint of shortening the mold opening/closing time of the injection core mold 24, the time of the deceleration region is preferably as short as possible. In the comparative example, when the time of the deceleration region is set to be short and the entire decrease curve is controlled by one function (function of the sine curve), a region in which the change rate of the speed per unit time is large is generated. As described above, when the change rate of the speed per unit time varies, abnormal hydraulic pressure fluctuation (surge pressure, oil hammer, or the like) is likely to occur in the hydraulic circuit on the oil discharge side. For example, when abnormal hydraulic pressure fluctuation occurs in the hydraulic circuit on the oil discharge side immediately before the cylinder is stopped, an event (bound phenomenon) in which the injection core mold 24 bounds without stopping at a stop position occurs, it becomes difficult to shorten the mold opening/closing time, and the variation in the mold opening/closing time also increases. In addition, damage to the mold and an increase in noise also occur due to the impact at the time of mold stop, and abrasion of hydraulic parts such as packing also increases due to the above-described hydraulic pressure fluctuation.

In contrast, in the present embodiment, the deceleration region is adjusted at the position of the start point T2 of the deceleration region, and the lifting/lowering speed of the mold opening/closing cylinder 50 can be adjusted by the indices n2 and n3 respectively in the first half portion and the second half portion of the deceleration region. In addition, in the second half portion of the deceleration region, the change rate of the speed per unit time in the decrease curve is made smaller than that in the first half portion.

At the time of mold closing of the mold opening/closing cylinder 50, the mold opening/closing cylinder 50 supporting the upper mold clamping plate 32 having a large weight (for example, 100 kg or more) is driven in the vertical direction to lower the injection core mold 24 at a high speed, so that the bound phenomenon of the injection core mold 24 is more likely to occur. However, according to the above control of the control unit 8, since the hydraulic pressure fluctuation in the hydraulic circuit on the oil discharge side of the mold opening/closing cylinder 50 is reduced in the second half portion (that is, immediately before the stop at T3), the bound phenomenon of the injection core mold 24 can be suppressed. As a result, the control unit 8 can shorten the mold opening/closing time and stabilize the mold opening/closing operation.

Description of Blow-Molding Method

Figure 6:
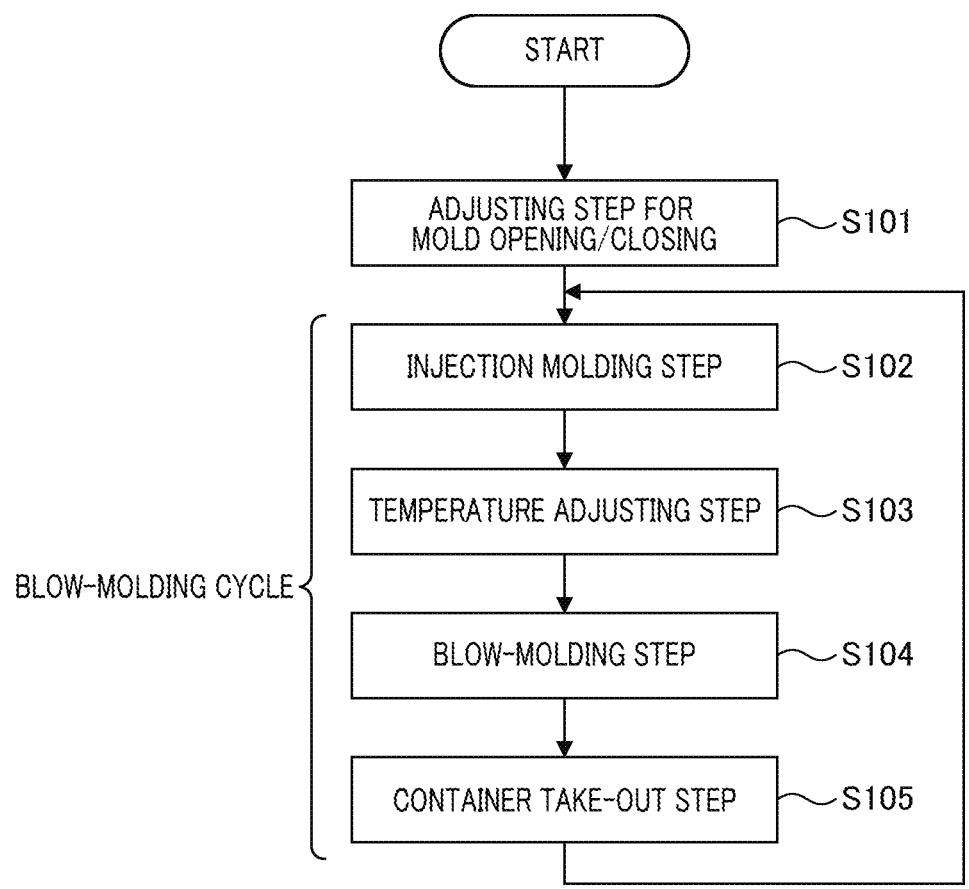
FIG. 6 is a flowchart illustrating steps of a blow-molding method of the present embodiment.

FIG. 6 is a flowchart illustrating steps of a blow-molding method performed by the blow-molding apparatus 1 according to the present embodiment. In the present embodiment, before each step (S102 to S105) of the blow molding cycle is performed, an adjustment step (S101) of the mold opening/closing operation for adjusting the lifting/lowering speed of the injection core mold 24 or the transfer plate 12 is performed.

(Step S101: Step of Adjusting Mold Opening/Closing Operation)

In the adjustment step of the mold opening/closing operation, an adjustment operation of the first control pattern of the first hydraulic drive device 63 or the second control pattern of the second hydraulic drive device 64 is performed.

As an example, a case where the first control pattern when the injection core mold 24 is closed by the first hydraulic drive device 63 is adjusted will be described. First, the control device 60 displays an adjustment screen 90 of the first control pattern on the display unit 61.

Figure 7:
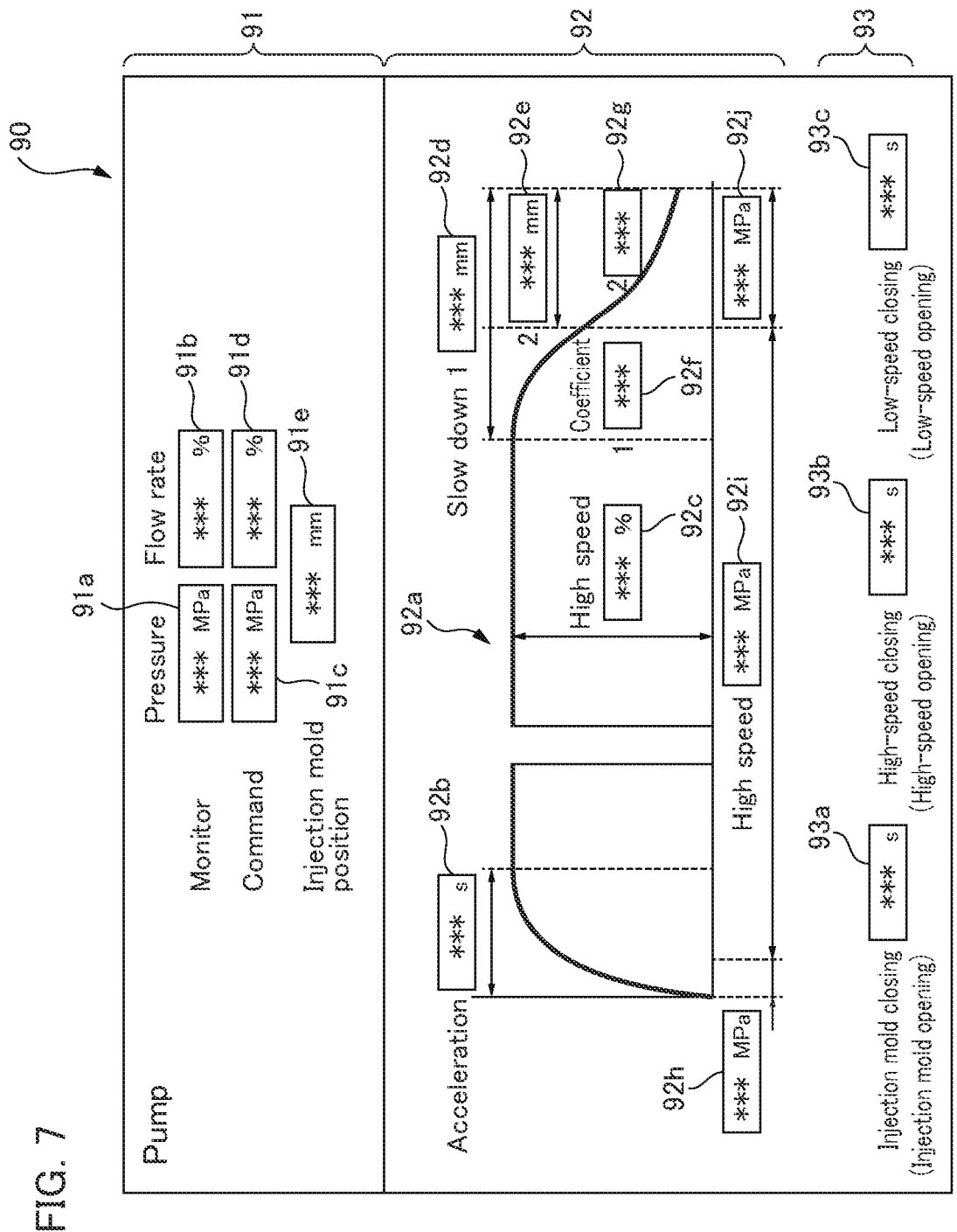
FIG. 7 is a diagram illustrating an example of an adjustment screen of a first control pattern.

FIG. 7 is a diagram illustrating an example of the adjustment screen 90 of the first control pattern displayed on the display unit 61. The adjustment screen 90 includes a first region 91, a second region 92, and a third region 93 in this order from the top of the screen. Note that the adjustment screen 90 in FIG. 7 is a screen at the time of the mold closing control, but can also be used as a screen at the time of the mold opening control, and the configurations of both screens are the same. To be noted, at least the second region 92 of the adjustment screen 90 may be different between the mold closing control and the mold opening control.

The first region 91 of the adjustment screen 90 is a region for displaying information of the first hydraulic drive device 63 and the position information of the injection core mold 24. The first region 91 displays a monitored value 91*a* of the pressure of the first hydraulic drive device 63 (or the hydraulic pump), a monitored value 91*b* of the flow rate of the first hydraulic drive device 63 (or the hydraulic pump), a command value 91*c* of the pressure of the first hydraulic drive device 63 (or the hydraulic pump), a command value 91*d* of the flow rate of the first hydraulic drive device 63 (or the hydraulic pump), and a monitored value 91*e* of the position of the injection core mold 24.

The second region 92 of the adjustment screen 90 displays a graph representation 92*a* of the curve (see FIGS. 5(A) and 5(B)) of the first control pattern and input items of various parameters for adjusting the curve. In a state where the adjustment screen 90 is displayed on the display unit 61, the control device 60 receives the input of parameters by the second region 92 from the user via the operation unit 62. To be noted, in the graph representation 92*a*, the vertical axis represents the lifting/lowering speed (speed change) of the hydraulic cylinder (cylinder rod) or the flow rate of the hydraulic oil that determines the lifting/lowering speed of the hydraulic cylinder (cylinder rod), and the horizontal axis represents time.

Input items in the second region 92 include an end point position 92*b* of the acceleration region, a speed 92*c* in the constant speed region, a start point 92*d* of the deceleration region, a start point 92*e* of the second half portion of the deceleration region, a coefficient 92*f* of the first half portion of the deceleration region, and a coefficient 92*g* of the second half portion of the deceleration region.

The end point position 92*b* of the acceleration region corresponds to T1 in FIG. 5A, and is defined by, for example, the elapsed time (seconds) from the start of movement of the injection core mold 24. The end point position 92*b* of the acceleration region may be defined by a movement distance (mm) from the mold stop position. The speed 92*c* in the constant speed region is defined by, for example, a ratio to a predetermined maximum speed (ratio to maximum discharge amount of the hydraulic oil in the hydraulic pump, ratio to the maximum flow rate of the hydraulic oil flowing from the first hydraulic drive device 63 to the hydraulic cylinder, the opening degree of the port of the electromagnetic proportional valve, or the like) (%). Since the speed 92*c* in the constant speed region is constant, part of the graph (straight line) is omitted in FIG. 7. The start point 92*d* of the deceleration region corresponds to T2 in FIGS. 5A and 5B, and is defined by, for example, a mold movement distance (mm) from the start point of the deceleration region to the mold stop position. The start point 92*e* of the second half portion of the deceleration region corresponds to T2' in FIG. 5B, and is defined by, for example, a mold movement distance (mm) from the start point of the second half portion of the deceleration region to the mold stop position. The coefficient 92*f* of the first half portion of the deceleration region is a parameter corresponding to n2 in FIGS. 5A and 5B. The coefficient 92*g* of the second half portion of the deceleration region is a parameter corresponding to n3 in FIGS. 5A and 5B. Therefore, the start point T2 and the indices n2 and n3 illustrated in FIGS. 5A and 5B are designated by the input of the above parameters of the second region 92.

In addition, the second region 92 further includes an input item related to the pressure of the pump that supplies the hydraulic oil to the first hydraulic drive device 63 and the hydraulic cylinder. The input items regarding the pressure of the pump include a pump pressure 92*h* at a rising portion of the acceleration region, a pump pressure 92*i* between the rising portion of the acceleration region and the start point of the second half portion of the deceleration region, and a pump pressure 92*j* at the second half portion of the deceleration region. Inputs of these parameters can adjust the flow rate and pressure of the hydraulic oil to the first hydraulic drive device 63 and the hydraulic cylinder.

The third region 93 of the adjustment screen 90 is a region for displaying actual time information when the mold is closed or when the mold is opened. The third region 93 displays a total required time 93*a* in mold closing, a time 93*b* in the constant speed region in mold closing, and a time 93*c* in the deceleration region in mold closing or mold opening.

The control device 60 sets the deceleration curve of the deceleration region in the first control pattern according to the start point T2 and the indices n2, and n3 that have received the input while the adjustment screen 90 is displayed. At this time, the control device 60 sets the change rate of the speed per unit time in the decrease curve of the second half portion to be smaller than that in the decrease curve of the first half portion. As a result, when the injection core mold 24 is closed, the hydraulic pressure fluctuation in the hydraulic circuit on the oil discharge side of the mold opening/closing cylinder 50 is reduced, and the bound phenomenon of the injection core mold 24 can be suppressed and the mold opening/closing time can be accelerated.

When the adjustment step of the mold opening/closing operation is completed, each step (blow-molding cycle) of the blow-molding method described below is executed.
(Step S102: Injection Molding Step)
First, in the injection molding unit 4, resin is injected from the injection device 3 into a preform-shaped mold space formed by the injection cavity mold 26, the injection core mold 24, and the neck mold 22 to manufacture the preform 20.

In step S102, the injection molding unit 4 is opened immediately after the completion of the resin injection or after the minimum cooling time provided after the resin injection. That is, the preform 20 is released from the injection cavity mold 26 and the injection core mold 24 in a high temperature state in which the outer shape of the preform 20 can be maintained. Thereafter, the transfer plate 12 rotate by a predetermined angle, and the preform 20 held by the neck mold 22 is conveyed to the temperature adjusting unit 5.

In the present embodiment, when injection molding of the resin material is performed at a temperature equal to or higher than the melting point of the resin material, the injection molding unit 4 performs only minimum cooling of the preform 20 after the injection molding, and the temperature adjusting unit 5 performs cooling and temperature adjustment of the preform 20. In the present embodiment, the time (cooling time) for cooling the resin material after completion of injection of the resin material by the injection molding unit 4 is preferably ½ or less of the time (injection time) for injecting the resin material. In addition, the time for cooling the resin material can be made shorter than the time for injecting the resin material depending on the weight of the resin material. The time for cooling the resin material is more preferably ⅖ or less, still more preferably ¼ or less, and particularly preferably ⅕ or less of the time for injecting the resin material. In the present embodiment, by significantly reducing the cooling time of the preform, the skin layer (surface layer in a solidified state) of the preform is formed thinner than before, and the core layer (inner layer in a softened or molten state) is formed thicker than before. That is, a preform having a large thermal gradient between the skin layer and the core layer and having high residual heat at a high temperature is formed.

The temperature of the injection-molded preform 20 is equalized by heat exchange (heat conduction) between the skin layer and the core layer in accordance with movement to the temperature adjusting unit 5. Further, the preform 20 is slightly cooled from the outer surface by the contact with the outside air. However, the temperature of the preform 20 is maintained at a substantially high release temperature until being carried into the temperature adjusting unit 5.
(Step S103: Temperature Adjusting Step)
Subsequently, the temperature adjusting unit 5 performs temperature adjustment for bringing the temperature of the preform 20 close to a temperature suitable for the final blow.

In the temperature adjusting step, first, the preform 20 is accommodated in a temperature adjustment space of the temperature control pot. Subsequently, the temperature control rod is inserted into the preform 20 accommodated in the temperature control pot.

In the temperature adjusting step, the preform 20 is brought into contact with the temperature control pot or the temperature control rod, so that the temperature of the preform 20 is adjusted so as not to be equal to or lower than a temperature suitable for blow molding, and the uneven temperature generated from injection molding is also reduced. Thereafter, the temperature of the preform 20 is maintained at the blow temperature until blow molding is performed. Note that the temperature control pot and the temperature control rod correspond to the shape of the preform 20, and the shape of the preform is maintained in a desired shape also in the temperature adjusting step.

After the temperature adjusting step, the transfer plate 12 rotates by a predetermined angle, and the preform 20 after the temperature adjustment held in the neck mold 22 is conveyed to the blow-molding unit 6.
(Step S104: Blow-Molding Step)
Subsequently, in the blow-molding unit 6, blow molding of the container is performed.

First, the blow-molding mold is closed to accommodate the preform 20 therein, and an air introduction member is inserted into the neck portion of the preform 20. Then, blow air is introduced into the preform 20 from the air introduction member while lowering the air introduction member also serving as the stretching rod. As a result, the preform 20 is shaped by being bulged so as to be in close contact with the blow-molding mold, and is thus blow-molded into the container.
(Step S105: Container Take-Out Step)
When the blow molding is completed, the blow-molding mold is opened. As a result, the container becomes movable from the blow-molding unit 6.

Subsequently, the transfer plate 12 rotates by a predetermined angle, and the container is conveyed to the take-out unit 7. In the take-out unit 7, the neck portion of the container is released from the neck mold 22, and the container is taken out to the outside of the blow-molding apparatus 1.

This completes one cycle of the blow-molding method. Thereafter, by rotating the transfer plate 12 by a predetermined angle, the respective steps of S102 to S105 described above are repeated. To be noted, during the operation of the blow-molding apparatus 1, containers for 4 cycles are manufactured in parallel at a time difference of one step each.

Note that, due to the structure of the blow-molding apparatus 1, the standby times of the injection molding step, the temperature adjusting step, the blow-molding step, and the container take-out step are the same. Similarly, the conveyance times between the steps are also the same.

Other Embodiments

The present invention is not limited to the above embodiment, and various improvements and design changes may be made without departing from the gist of the present invention.

In the above embodiment, the control when the injection core mold 24 of the injection molding unit 4 is closed has been mainly described. However, the same control as in the above embodiment can be performed for the operation of the injection core mold 24 at the time of mold opening and the lifting/lowering operation of each transfer plate 12 in the injection molding unit 4, the temperature adjusting unit 5, and the blow-molding unit 6. In addition, the control of the above embodiment can also be applied to, for example, an opening/closing operation of a blow mold (split mold) of the blow-molding unit 6.

Further, the configuration of the mold opening/closing device of the above embodiment is not limited to application to a blow-molding apparatus of a hot parison type. For example, the same control as in the above embodiment may be performed in an injection molding apparatus used for manufacturing a preform at a high speed.

Figure 8:
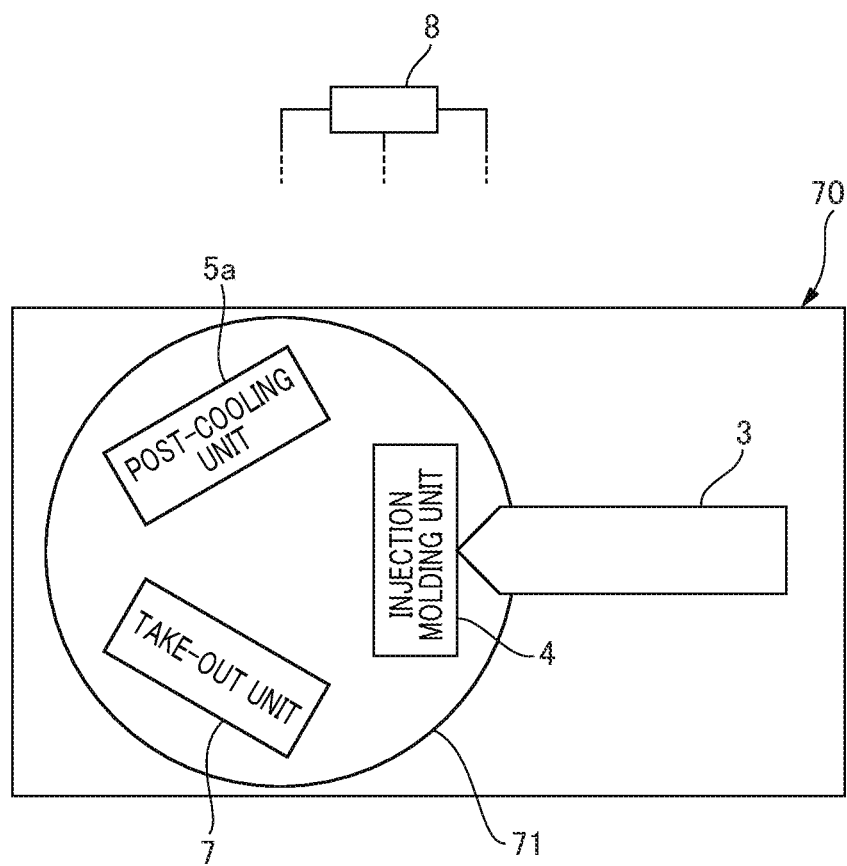
FIG. 8 is a schematic plan view illustrating a configuration example of an injection molding apparatus including a mold opening/closing device.

FIG. 8 is a diagram schematically illustrating a configuration of an injection molding apparatus 70 including a mold opening/closing device. The injection molding apparatus 70 in FIG. 8 is an apparatus used for manufacturing a preform at a high speed, and corresponds to the blow-molding apparatus 1 of the above embodiment excluding the blow-molding unit 6. Therefore, in the description of FIG. 8, the same components as those of the above embodiment are denoted by the same reference signs, and redundant description is omitted.

The injection molding apparatus 70 includes the injection molding unit 4, a post-cooling unit 5a, the take-out unit 7, a rotating plate 71 serving as a conveyance mechanism, and the control unit 8.

The injection molding unit 4, the post-cooling unit 5a, and the take-out unit 7 are disposed at positions rotated by a predetermined angle each (for example, 120 degrees) in the circumferential direction of the rotating plate 71. In the injection molding apparatus 70, the rotation of the rotating plate 71 conveys the preform having the neck portion held by the rotating plate 71 to the injection molding unit 4, the post-cooling unit 5a, and the take-out unit 7 in this order.

The configurations of the injection molding unit 4, the take-out unit 7, and the control unit 8 are similar to those of the above-described embodiment. To be noted, the injection device 3 that supplies a resin material is connected to the injection molding unit 4.

The post-cooling unit 5a includes a mold unit (temperature control pot and temperature control rod) for cooling the preform, and can cool the preform in a short time to such an extent that the preform can be discharged in a cured state by the take-out unit 7. The post-cooling unit 5a is a kind of the temperature adjusting unit 5 in a broad sense.

In the injection molding apparatus 70, the post-cooling unit 5a is provided downstream of the injection molding unit 4, so that the post-cooling unit 5a can additionally cool the preform. By additionally cooling the preform in the post-cooling unit 5a, the preform can be released even in a high temperature state in the injection molding unit 4, and the cooling time of the preform in the injection molding unit 4 can be significantly shortened. As a result, the molding of the next preform can be started early, and thus the molding cycle time of the preform in the injection molding apparatus 70 can be shortened.

In addition, since the hydraulic pressure fluctuation in the hydraulic circuit on the oil discharge side of the mold opening/closing cylinder is reduced in the second half portion of the deceleration region, the bound phenomenon of the injection core mold and the like can be suppressed, and shortening of the mold opening/closing time and stabilization of the mold opening/closing operation can be realized.

In addition, the configuration of the mold opening/closing device of the present invention is not limited to the configuration of the injection molding unit 4 of the above embodiment. For example, for the mold opening/closing device of the present invention, the arrangement of the hydraulic cylinder and the like can be changed variously as in the injection molding unit 4 illustrated in FIG. 9.

Figure 9:
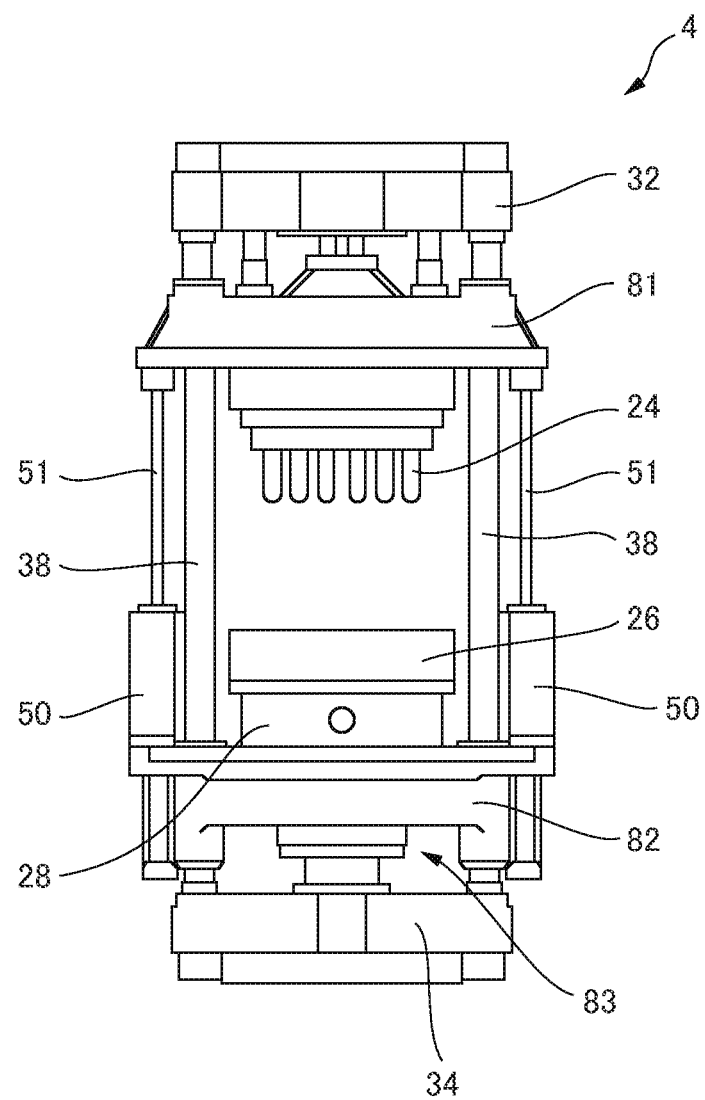
FIG. 9 is a diagram illustrating another example of an injection molding unit.

FIG. 9 is a diagram illustrating another example of the injection molding unit 4 including the mold opening/closing device. To be noted, in FIG. 9, the same elements as those of the above embodiment are denoted by the same reference signs, and redundant description is omitted.

The injection molding unit 4 includes the upper mold clamping plate 32, the lower mold clamping plate 34, the mold opening/closing cylinder 50, a movable plate 81, and a lower base plate 82. The upper mold clamping plate 32 is fixed to the upper end side of the tie bar 38, and the lower mold clamping plate 34 is fixed to the lower end side of the tie bar 38. The lower mold clamping plate 34 is disposed so as to be vertically movable below the lower base plate 82.

The movable plate 81 is disposed between the lower base plate 82 and the upper mold clamping plate 32, and is supported so as to be movable in the up-down direction by mold opening/closing piston rods (cylinder rods) 51 extending from a pair of mold opening/closing cylinders (hydraulic cylinders) 50. The injection core mold 24 is attached to the lower surface side of the movable plate 81.

The lower base plate 82 is fixed and held on an upper side of a machine base (not illustrated in FIG. 9). A pair of mold opening/closing cylinders 50 that vertically move the mold opening/closing piston rod 51 is fixed to the upper surface side of the lower base plate 82, and the injection cavity mold 26 and the hot runner mold 28 are placed therebetween. The lower mold clamping plate 34 is connected to the lower surface side of the lower base plate 82 via a stretchable mold clamping cylinder 83.

The mold opening/closing cylinder 50 is connected to a hydraulic circuit (not illustrated) through which the hydraulic oil flows via a hydraulic drive device (not illustrated) including an electromagnetic proportional valve. In addition, the injection molding unit 4 includes a control unit (not illustrated) capable of adjusting the flow rate of the hydraulic oil to the mold opening/closing cylinder 50. In addition, similarly to FIGS. 5A and 5B, the control unit includes a control device, an operation unit, and a display unit (not illustrated) that can adjust (input/change) a control pattern for controlling the flow rate of the hydraulic oil. As in FIGS. 5A and 5B, the control pattern includes a decrease curve that changes the movement of the hydraulic cylinder (speed change of the cylinder rod) in the deceleration region between the first half portion and the second half portion.

In the injection molding unit 4 illustrated in FIG. 9, the movable plate 81 is lifted and lowered by driving of the mold opening/closing cylinder 50 (vertical movement of the mold opening/closing piston rod 51). As a result, a mold opening/closing operation is performed in which the injection core mold 24 fixed to the movable plate 81 is lifted and lowered in the up-down direction. Also in the control of the mold opening/closing operation by the mold opening/closing cylinder 50 illustrated in FIG. 9, the same control as in the above embodiment can be applied. That is, according to the decrease curve set by the control unit, the lifting/lowering speed (lowering speed) of the mold opening/closing piston rod 51 is controlled in the deceleration region, so that shortening of the mold opening/closing time and stabilization of the mold opening/closing operation can be realized.

In addition, the embodiment disclosed herein should be considered in all respects as illustrative and not restrictive. The scope of the present invention is indicated not by the above description but by the claims, and it is intended that meanings equivalent to the claims and all modifications within the scope are included.

The invention claimed is:

1. A control method for a mold opening/closing device, the mold opening/closing device including:
   a hydraulic cylinder that opens and closes a mold;
   a hydraulic drive device that drives the hydraulic cylinder by supplying a hydraulic oil; and
   a controller that controls the hydraulic drive device,
   wherein the controller changes speed change in a deceleration region, in which movement of the hydraulic cylinder is decelerated, between a first half portion and a second half portion of the deceleration region, in the control in the deceleration region when the mold is closed, the speed is changed nonlinearly in the first half portion, the controller causes speed change rate per unit time in the second half portion to be smaller than in the first half portion and controls the speed change in the second half portion to be closer to linear than the speed change in the first half portion, and the speed change in the second half portion is non-zero.

2. The control method for a mold opening/closing device according to claim 1, wherein the controller controls the speed change in the first half portion of the deceleration region and the speed change in the second half portion of the deceleration region respectively by functions of different indices, and receives input of a first index that defines a function of the first half portion and input of a second index that defines a function of the second half portion from outside.

3. The control method for a mold opening/closing device according to claim 2, wherein the controller further receives input of a start point of the deceleration region from the outside, and changes the start point of the deceleration region on the basis of the input.

4. The control method for a mold opening/closing device according to claim 1, wherein the controller displays a graph representing the speed change in the deceleration region on a display device.

5. The control method for a mold opening/closing device according to claim 1, wherein the hydraulic cylinder drives the mold along a vertical direction.

6. A mold opening/closing device comprising:

a hydraulic cylinder that opens and closes a mold;

a hydraulic drive device that drives the hydraulic cylinder by supplying a hydraulic oil; and a controller that controls the hydraulic drive device, wherein the hydraulic cylinder drives the mold along a vertical direction, wherein the controller changes speed change in a deceleration region, in which movement of the hydraulic cylinder is decelerated, between a first half portion and a second half portion of the deceleration region, in the control in the deceleration region when the mold is closed, the speed is changed nonlinearly in the first half portion, the controller causes speed change rate per unit time in the second half portion to be smaller than in the first half portion and controls the speed change in the second half portion to be closer to linear than the speed change in the first half portion, and the speed change in the second half portion is non-zero.

7. The mold opening/closing device according to claim 6, wherein the controller performs output to display a screen including a graph representing the speed change of the hydraulic cylinder on a display device, and receives input of a parameter for adjusting the speed change of the hydraulic cylinder via the screen.

8. The mold opening/closing device according to claim 7, wherein the controller controls the speed change in the first half portion of the deceleration region and the speed change in the second half portion of the deceleration region respectively by functions of different indices, and receives input of a first index that defines a function of the first half portion and input of a second index that defines a function of the second half portion via the screen.

9. The mold opening/closing device according to claim 8, wherein the controller further receives input of a start point of the deceleration region via the screen, and changes the start point of the deceleration region on the basis of the input of the start point.

10. The mold opening/closing device according to claim 7, wherein the controller receives, via the screen, input of a parameter for adjusting a flow rate of the hydraulic oil to the hydraulic cylinder in the deceleration region.

* * * * *